Patented Mar. 29, 1927.

1,622,991

UNITED STATES PATENT OFFICE.

OTTO PAUL CURT BREDT, OF ALLENTOWN, PENNSYLVANIA, ASSIGNOR TO TROJAN POWDER COMPANY, OF NEW YORK, N. Y., A CORPORATION OF NEW YORK.

TREATMENT OF FORMATES OF METALS OF THE ALKALI-EARTH GROUP.

No Drawing. Application filed April 7, 1921, Serial No. 459,500. Renewed January 12, 1924.

My invention relates to the treatment of formates of the alkali earth group, and more particularly to the preparation of oxalic acid from such formates.

It is well known that when formates are heated, a more or less complete transformation to oxalates may be obtained. The preparation of sodium oxalate from sodium formate by regulated heating has long been practiced on a large commercial scale, and today forms the basis of the synthetic oxalic acid industry.

When calcium formate, or the formate of any of the other alkali earth metals, is treated in a similar manner, the production of oxalate is much less complete than when sodium formate is similarly treated.

I have discovered a convenient and cheap means by which the formates of alkali earth metals may be treated for the preparation therefrom of oxalic acid, with much better yields than those which could be obtained by hitherto known methods.

As an illustration of my invention I will explain the procedure which I employ in the preparation of oxalic acid from calcium formate, although by a related procedure I may obtain equivalent results with the formates of other alkali earth metals.

I first treat calcium formate with a dilute solution of caustic soda, whereby a reaction is brought about, with the precipitation of calcium hydroxide as an insoluble sludge, and the formation of sodium formate. This reaction may be thus stated:

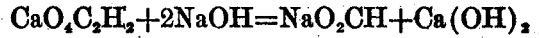

I separate the calcium hydroxide from the soluble sodium formate, and dry the sodium formate and convert it in the usual way to sodium oxalate.

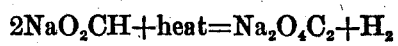

I next bring this sodium oxalate into reaction with my precipitated sludge of calcium hydroxide, at which a reaction occurs with the formation of sodium hydroxide and the precipitation of calcium oxalate.

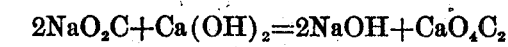

The calcium oxalate is of course capable of conversion into oxalic acid by treatment with sulfuric acid in the usual way.

It will be noted that by my invention calcium formate is converted into calcium oxalate indirectly, and without the losses in yield which occur when the direct transformation is attempted. Each of the reactions goes on readily with high or practically quantitative yields. In the first stage of my reaction I use sodium hydroxide and obtain calcium hydroxide, and in the second stage of my reaction I use calcium hydroxide and obtain sodium hydroxide. As a result no reagents are employed in my process beyond the quantity used in the treatment of the first batch, and the addition of sufficient fresh material to replace the small amount lost in the wash-waters.

Although my present procedure involves three steps, as compared with the single step of heating calcium formate to prepare calcium oxalate therefrom, yet as each of the three steps which I use involves very small losses, the result obtained by the use of the three steps is more economical and desirable than the use of the single step procedure as at present practiced.

I claim:

1. A process comprising reacting upon calcium formate with sodium hydroxide to form sodium formate, heating the sodium formate to obtain sodium oxalate, and causing the sodium oxalate to react with calcium hydroxide to form calcium oxalate and sodium hydroxide.

2. A process comprising reacting upon calcium formate with sodium hydroxide to form sodium formate and calcium hydroxide, transforming the sodium formate to sodium oxalate, and bringing about a reaction between the sodium oxalate and the calcium hydroxide resulting from the first reaction to form calcium oxalate, and regenerate sodium hydroxide.

3. A continuous process for the preparation of oxalates from calcium formate, which consists in treating the calcium formate with sodium hydroxide to form sodium formate and calcium hydroxide, converting the sodium formate to sodium oxalate, causing reaction between the sodium oxalate and calcium hydroxide to form calcium oxalate and sodium hydroxide, removing the calcium oxalate and supplying fresh calcium formate for reaction with the regenerated sodium hydroxide and the succeeding treatment as described.

4. In the treatment of calcium formate to produce oxalates therefrom, the step of transforming calcium formate into sodium formate.

5. In the process of producing oxalates from calcium formate, the step which consists in treating calcium formate with sodium hydroxide to form sodium formate and calcium hydroxide.

6. A process comprising reacting upon the formate of an alkali earth metal with sodium hydroxide to form sodium formate and the hydroxide of said metal, transforming the sodium formate to sodium oxalate, and reacting upon the sodium oxalate with the hydroxide of the alkali earth metal resulting from the first reaction to form the oxalate of the said metal and regenerate sodium hydroxide.

OTTO PAUL CURT BREDT.